J. & J. W. SLINGSBY.
SAW FILING DEVICE.
APPLICATION FILED APR. 12, 1912.
1,039,602.
Patented Sept. 24, 1912.
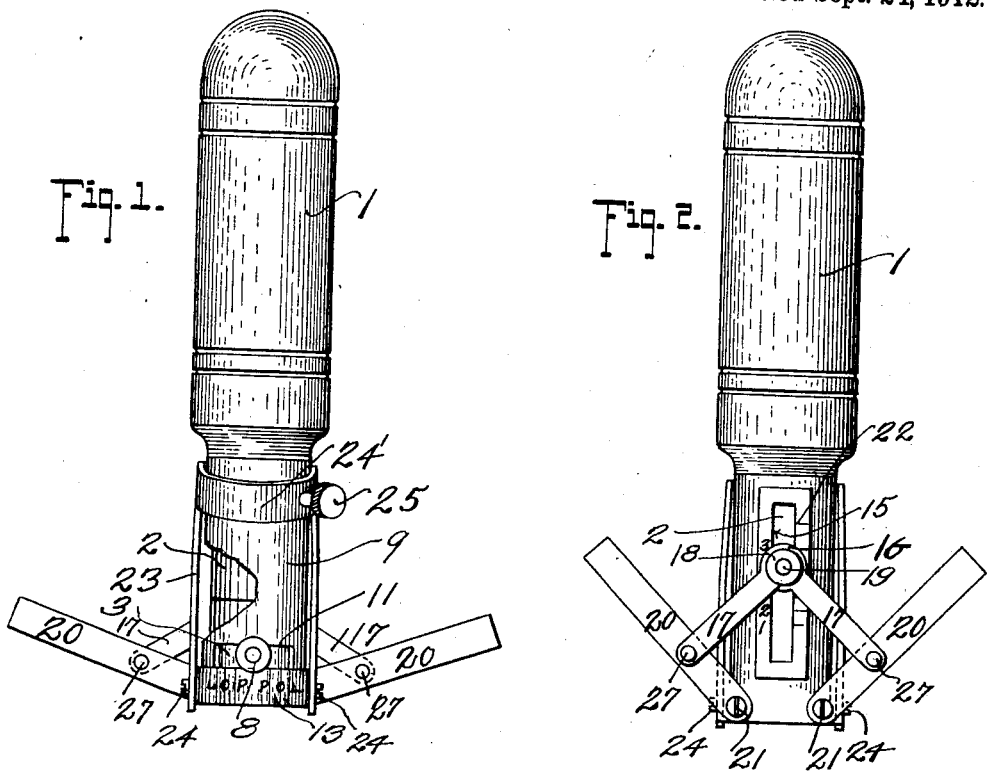
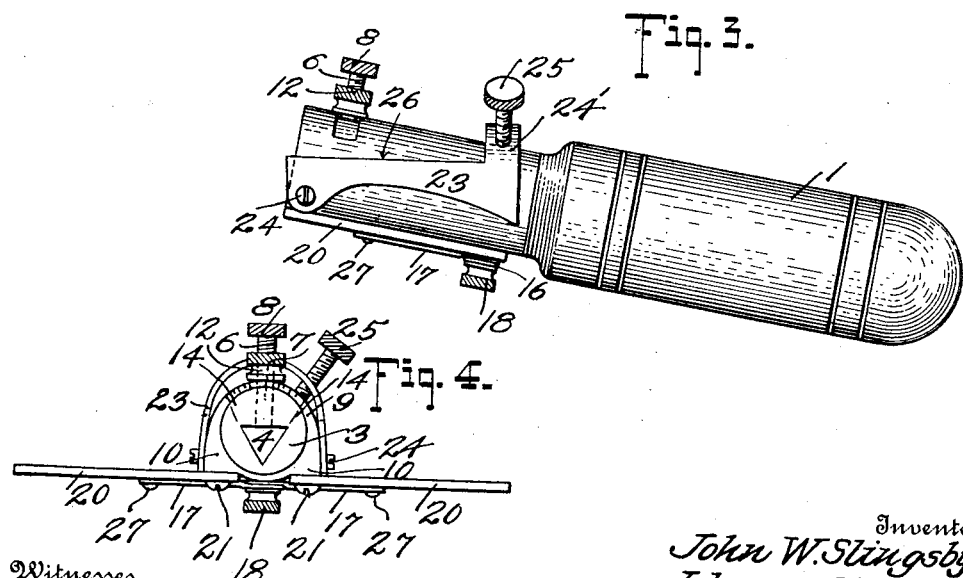
Witnesses
E. H. Wagner
G. W. Kirkley
Inventors
John W. Slingsby
John Slingsby
By Robb
Attorneys
COLUMBIA PLANOGRAPH CO., WASHINGTON, D. C.

UNITED STATES PATENT OFFICE.

JOHN SLINGSBY AND JOHN W. SLINGSBY, OF LOS ANGELES, CALIFORNIA.

SAW-FILING DEVICE.

1,039,602.  Specification of Letters Patent.  Patented Sept. 24, 1912.

Application filed April 12, 1912. Serial No. 690,290.

*To all whom it may concern:*

Be it known that we, JOHN SLINGSBY and JOHN W. SLINGSBY, citizens of the United States, residing at Los Angeles, in the county of Los Angeles and State of California, have invented certain new and useful Improvements in Saw-Filing Devices, of which the following is a specification.

The present invention relates to saw filing devices and particularly to that class of apparatus in which means are provided for adjustably holding the file and for directing its movement with reference to the saw to be filed so that the even and uniform filing of a series of saw teeth may be effected in a rapid and certain manner.

An object of the invention is to provide a saw filing device which will afford means for easily and quickly adjusting the position of the file rotatably with reference to the body of the device, so as to give various degrees of pitch to the teeth of different saws; to provide means for directing the movement of the file so as to provide varying degrees of lateral inclination and so that a uniform bevel may be imparted to the teeth throughout the operation, once the degree of bevel has been determined; and to provide means for guiding the eye so as to maintain the device at a constant vertical inclination throughout the operation in order to obtain a constant degree of vertical bevel.

A further object of the invention is to provide a device having the above characteristics which will be independent in its movement of any clamps, slides, or other attachment for holding the saw, so that much greater freedom may be obtained during the operation of filing the saw teeth.

For a full understanding of the present invention, reference is to be had to the following description and to the accompanying drawings, in which—

Figure 1 is a top plan view of the saw filing device. Fig. 2 is a bottom plan view thereof. Fig. 3 is a side elevation. Fig. 4 is a central section through the file holder, showing certain parts in elevation.

Throughout the following detail description and on the several figures of the drawings, similar parts are referred to by like reference characters.

In the drawings, 1 indicates a wooden body, preferably cylindrical in form, and which will be grasped by the hand during the operation of the saw filing device. At the forward portion of the body, as at 2, it is made of restricted diameter and at the outer end, a ferrule 3 is disposed, said ferrule being provided at its outer end with a substantially triangular shaped opening 4, corresponding to the shape of an ordinary file used for filing saw teeth. An opening, substantially triangular in cross-section is formed in the restricted body portion 2, which opening is in alinement with the triangular opening formed in the ferrule, said opening being adapted to afford a socket for the reception of a file. After the file is inserted, it is held in its place by means of a screw 6 having a bearing through a screw-threaded portion 7 of the ferrule and restricted body portion 2, said screw being provided with a head 8 adapted to be grasped by the fingers so as to regulate the screw.

On the outer surface of the restricted body portion 2 and the ferrule 3, a sleeve 9 is rotatable to a certain extent, but said sleeve is not capable of longitudinal movement to any appreciable degree with reference to the portion 2. The sleeve is provided at its front end with extensions 10, to afford bearings for the screws which provide the pivoting means for the guide arms hereinafter referred to, and on its upper surface, the sleeve is provided with a transverse slot 11 through which the screw 6 passes and the abutting of the material of the sleeve at the ends of the slot against the screw limits the extent of the rotative action of the sleeve 9. On the screw 6, a threaded head 12 is mounted, as is best shown in Figs. 3 and 4, said head being capable of movement up and down on the threads of the screw, the arrangement being such that when the file has been inserted and is held in place by moving down the screw 6, downward movement on the part of the head 12 will result in clamping the sleeve 9 to the restricted body portion 2 and ferrule 3 so as to prevent rotation of the sleeve. On the upper portion of the sleeve 9, and preferably on the portion thereof between the slot 11, and the forward end of the sleeve, a scale 13 is provided, the marks of which indicate the different degrees of pitch which it is desired to impart to the saw tooth when filing the same. Each of the marks of the scale is adapted to be brought to register with a mark 14 on each side of the front face of the ferrule 3. It will be seen that, the file having been inserted and held in place by means of the screw 6, on the rotation of the sleeve 9 so as to bring one of the marks on the scale 13 into register with one of the marks 14, varying degrees of inclination may be imparted to the file, so as to provide for varying degrees of pitch which it is desired to impart to the saw teeth.

On the under side of the sleeve 9, we provide a slotted guide-way 15 which extends longitudinally of the sleeve nearly the entire length thereof, the shape of this guide-way being best shown in Fig. 2. In this guide-way the head 16 is slidable, said head having pivotal connections with two arms 17 which are somewhat loosely mounted thereon, but which may be held in fixed position with reference to the head by means of a thumb-nut 18 which is movable up and down for a slight distance on the screw 19, fixedly connected to the head 16. A pair of arms 20, each one of which is pivoted at 21 to the extension 10 on the lower side of the sleeve and on opposite sides thereof, are connected to the arms 17 by pivot bearings 27, which arrangement is best shown in Fig. 2. It will be obvious that by moving the head 16 to and fro in the slotted guide-way 15, the arms 20 may be brought to a position where they are parallel with and against the sides of the slotted guide-way 15, this being the case when the head 16 is in its most rearward position, or the arms may be spread to any angular inclination desired with reference to the slotted guide-way, according to the distance to which the head 16 may be moved forwardly. It will be obvious that each arm 20, by virtue of the construction described, will make the same angle with reference to the guide-way 15. A scale 22 is provided on the edges of the slotted guide-way 15, this scale serving to indicate to the operator the inclination at which the arms 20 are to be placed, so as to provide for a certain degree of lateral bevel desired in the saw teeth.

At suitable points on the sleeve 9, and preferably at opposite points on the extension 10 adjacent to the position where the bearings 21 are located, a swinging guiding frame 23 is pivoted by means of the screws 24, said frame being of the shape particularly shown in Figs. 1 and 3; that is, it consists of two spaced arms, each of which passes on opposite sides of the sleeve 9, and which arms are connected by means of a cross piece 24' which may engage the upper side of the sleeve 9 at its rear portion, as particularly shown in Fig. 3. A regulating screw 25 passes through the cross piece 24' by the adjustment of which the swinging frame may be elevated to a greater or lesser degree with reference to the sleeve. The purpose of this swinging arm is to serve as a guide to the eye in order to maintain the saw filing device at a uniform vertical inclination with reference to the saw which is being operated on. This feature of the improvements may best be illustrated in Fig. 3, where it will be seen that the longitudinal edge 26 of the swinging frame is in a substantially horizontal position, where it will be maintained by adjusting the screw 25 so that its inner or lower end contacts with the sleeve 9. When once it is decided what degree of vertical inclination it is desired to impart to the bevel of the saw teeth, the swinging frame 23 will be fixed in its adjusted position and during the operation of filing, the holder will be moved so that the edge 26 of the frame will always be in a horizontal plane. The purpose of the arms 20 is to guide the eye so as to enable the operator to hold the saw filing device at a constant lateral angular inclination with reference to the saw when once the degree of such angular inclination has been determined in order to impart the required degree of lateral bevel to the saw teeth. During the operation of filing, the file holder will be moved so that the arms 20 will always be maintained parallel to the edge of the saw to be operated on; that is to say, they should move through parallel vertical planes. The provision of having the arms 20 so disposed with reference to the body of the device that each makes the same angle with reference to the longitudinal axis of the body is a valuable one when it is desired to impart the same degree of bevel to both sides of the teeth of the saw. When the operation of finishing the teeth in one direction is concluded, the arm 20 always maintaining a parallel position with reference to the saw, the other arm 20, which will serve as a guide when the teeth are filed in a reverse direction, will make the same angle with reference to the saw, thus insuring the same degree of bevel.

Having thus described the invention, what is claimed as new is:

1. A saw filing device comprising a member adapted to receive and hold a file, a casing mounted on said member and rotatable with respect thereto, means for maintaining the casing and said member against relative movement, arms connected with said casing and movable with respect thereto, and means for maintaining the arms in an adjusted position.

2. A saw filing device comprising a member adapted to receive and hold a file, a casing mounted on said member and rotatable with respect thereto, means for maintaining the casing and said member against relative movement after they have been moved to their relative adjusted positions, a pair of arms pivotally connected with said casing and capable of outward spreading movement with respect thereto, and means for maintaining the arms in an adjusted position.

3. A saw filing device comprising a member adapted to receive and hold a file, a casing mounted on said member and rotatable with respect thereto, means for maintaining the casing and said member against relative movement, a pair of arms connected with said casing and capable of outward spreading movement with respect to the casing, means for maintaining the arms in an adjusted position, and a swinging frame pivoted to the casing and adapted to be held in an inclined position with respect thereto.

4. In a saw filing device, a body portion having means for receiving and holding a file, a casing rotatably mounted on said body portion, means for maintaining the casing in an adjusted position, arms connected with said casing, and means for spreading said arms.

5. In a saw filing device, a body portion having means for receiving and holding a file, a casing rotatably mounted on said body portion, means for maintaining the casing in an adjusted position, a pair of arms capable of outward spreading movement with respect to the casing, a head movable on the casing and having connections with said arms for outwardly spreading the same, and a swinging frame pivoted on said casing and movable in a vertical plane with respect thereto.

6. A saw filing device comprising a member adapted to receive and hold a file, a casing mounted on said member and rotatable with respect thereto, means for maintaining the casing and said member against relative movement, a pair of arms connected with said casing and capable of outward spreading movement with respect to the casing, the arms being capable of making different angles of inclination with respect to the longitudinal axis of the casing, means for maintaining the arms in an adjusted position, and a swinging frame pivoted to said casing and adapted to be held in an inclined position with respect thereto, said swinging frame having a portion thereof adapted to serve as a guide to the eye for maintaining the device when in operation at the proper vertical inclination.

7. In a saw filing device, a body portion having means for receiving and holding a file, a casing rotatably mounted on said body portion, means for maintaining the casing in an adjusted position with reference to the body portion, arms pivotally mounted on said casing, a slotted guide-way in the casing, a head movable in said slotted guide-way, said head having connection with said arms for outwardly spreading the same on the forward movement of the head, and means for maintaining the arms in an adjusted position.

8. In a saw filing device, a body portion having means for receiving and holding a file, a casing rotatably mounted on said body portion, means for maintaining the casing in an adjusted position with reference to the body portion, arms pivotally mounted on said casing, a slotted guide-way in the casing, a head movable in said slotted guide-way, said head having connections with said arms for outwardly spreading the same on the forward movement of the head, means for maintaining the arms in an adjusted position, and a swinging frame pivotally mounted on said casing and movable in a vertical plane with respect thereto and adapted to be held in an inclined position with respect to the casing, said frame having a portion adapted to serve as a guide to the eye for maintaining the device at the proper inclination.

9. A saw filing device comprising a member adapted to receive a file, a screw passing through said member adapted to engage the file and hold the latter in position, a casing mounted on said member and rotatable with respect thereto, said casing being provided with a slot through which said screw passes and the edges of which slot tend to limit the rotative movement of the casing, a head movable on said screw adapted to hold said casing against relative movement with respect to said member, a pair of arms mounted on said casing and capable of outward spreading movement with respect thereto, and means for maintaining the arms in an adjusted position.

10. A saw filing device comprising a member adapted to receive a file, a screw passing through said member adapted to engage the file and hold the latter in position, a casing rotatable with respect to said member, said casing being provided with a slot through which said screw passes and the edges of which slot tend to limit the rotative movement of the casing, a head movable on said screw adapted to hold said casing against relative movement with respect to said member, a pair of arms pivoted to said casing and capable of outward spreading movement with respect thereto, a slotted guide-way in said casing, means movable in said slotted guide-way for spreading said arms and maintaining the same in an adjusted position, and a swinging frame pivoted to said casing and adapted to be held in an inclined position with respect thereto and said frame having a portion thereof adapted to serve as a guide to the eye for maintaining the device at the proper angular inclination.

11. In a saw filing device, a body portion having means for receiving and holding a file, a casing rotatably mounted on said body portion, means for maintaining the casing in an adjusted position with reference to the body portion, a scale arranged on the casing adapted to register with indicating marks arranged on said body portion, arms pivotally mounted on said casing and capable of outward spreading movement with respect thereto, means for moving said arms so as to maintain both arms at the same angular inclination with respect to the longitudinal axis of the casing, and a scale arranged on the casing adapted to indicate the desired movement of the arms.

In testimony whereof we affix our signatures in presence of two witnesses.

JOHN SLINGSBY.
JOHN W. SLINGSBY.

Witnesses:
J. J. SULLIVAN,
G. R. COMTÉ.